(12) United States Patent
Karas (10) Patent No.: US 11,679,865 B2
(45) Date of Patent: Jun. 20, 2023

(54) AIRCRAFT YOKE INTERFERENCE DETECTION SYSTEM AND METHOD

(71) Applicant: HONEYWELL INTERNATIONAL INC., Charlotte, NC (US)

(72) Inventor: Ondrej Karas, Brno (CZ)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 37 days.

(21) Appl. No.: 17/353,482

(22) Filed: Jun. 21, 2021

(65) Prior Publication Data
US 2022/0402596 A1 Dec. 22, 2022

(51) Int. Cl.
| *B64C 13/04* | (2006.01) |
| *B64C 9/00* | (2006.01) |
| *B64C 13/18* | (2006.01) |
| *G05D 1/10* | (2006.01) |

(52) U.S. Cl.
CPC ............ *B64C 13/0423* (2018.01); *B64C 9/00* (2013.01); *B64C 13/18* (2013.01); *G05D 1/101* (2013.01)

(58) Field of Classification Search
CPC ....... B64C 13/0423; B64C 9/00; B64C 13/18; G05D 1/101
See application file for complete search history.

(56) References Cited

U.S. PATENT DOCUMENTS

| 3,378,217 | A | 4/1968 | Diani |
| 4,281,811 | A | 8/1981 | Nixon |
| 8,718,839 | B2 | 5/2014 | Everett et al. |
| 8,761,965 | B2 | 6/2014 | Righi et al. |
| 9,405,295 | B2 | 8/2016 | Polati De Souza et al. |
| 10,274,959 | B2 | 4/2019 | Estabrook |
| 10,960,971 | B1 | 3/2021 | Hagerott et al. |
| 2007/0124038 | A1 | 5/2007 | Goupil |
| 2010/0200705 | A1 | 8/2010 | Perez |
| 2016/0046364 | A1* | 2/2016 | Buethe .................. B64C 13/503 244/228 |
| 2017/0108868 | A1 | 4/2017 | Johnson et al. |
| 2018/0107228 | A1* | 4/2018 | Williams ............. G05D 1/0808 |
| 2019/0286166 | A1* | 9/2019 | De Lima ................ B64D 31/06 |
| 2020/0094941 | A1* | 3/2020 | Barmichev ............... B64C 7/00 |
| 2020/0116751 | A1* | 4/2020 | Tang .................... G05D 1/0825 |
| 2021/0347466 | A1* | 11/2021 | Sumerel ............... G05D 1/0676 |

FOREIGN PATENT DOCUMENTS

GB 1520391 A 8/1978

* cited by examiner

*Primary Examiner* — Rodney A Bonnette
(74) *Attorney, Agent, or Firm* — Lorenz & Kopf LLP (57) ABSTRACT

A system and method for detecting yoke interference for an aircraft having an auto pitch trim function is provided. The system includes a source of elevator load data, a source of aircraft speed data, and a processing system. The processing system is coupled to receive the elevator load data, the aircraft speed data, and initial condition center-of-gravity (CG) data that is representative of at least an estimated initial position of the CG of the aircraft. The processing system is configured to process at least the speed data and the initial condition CG data to: (i) determine an expected elevator load on the elevator flight control surface, (ii) determine if the expected elevator load exceeds the sensed elevator load by a predetermined magnitude, and (iii) when the expected elevator load exceeds the sensed elevator load by a predetermined magnitude, generate a disconnect signal that will disable the auto pitch trim function.

20 Claims, 4 Drawing Sheets

AIRCRAFT YOKE INTERFERENCE DETECTION SYSTEM AND METHOD

TECHNICAL FIELD

The present invention generally relates to aircraft automatic pitch trim systems, and more particularly relates to an aircraft yoke interference detection system and method that can automatically disable an aircraft automatic pitch trim system.

BACKGROUND

Many aircraft autopilot systems include an automatic pitch trim (APT) function. The APT function, when included, commands stabilizer or elevator trim tab motion based on the measured servo load associated with the stabilizer or elevator trim tab. For aircraft equipped with a yoke, when the autopilot is not engaged, the pilot manually controls the pitch of the aircraft by pushing and pulling on the yoke.

Although occurrences are rare, there have been instances in which an aircraft pilot, on aircraft equipped with a yoke, inadvertently interferes with the yoke. Such inadvertent interference may occur due to inattention, distraction, drowsiness, or incapacitation. No matter the cause, such interference may cause an undesired response. For example, with currently configured APT functions, if the pilot inadvertently pushes forward on the yoke while the APT function is operating, the APT would cause the stabilizer or elevator trim tab to counteract the manual command from the yoke until the pilot is no longer pushing on the yoke, or until a predetermined time limit is reached, at which point an APT monitor trips. This, however, leaves the aircraft in an undesired pitch up configuration, resulting in an undesired aircraft climb.

Hence, there is a need for a system and method of detecting undesired yoke interference early on, to allow the APT function to be automatically disengaged before the aircraft attains an undesired out-of-trim condition. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft yoke interference detection system for an aircraft having an auto pitch trim function includes a source of elevator load data, a source of aircraft speed data, and a processing system. The elevator load data is representative of sensed load on an elevator flight control surface, and the aircraft speed data is representative of sensed aircraft speed. The processing system is coupled to receive the elevator load data, the aircraft speed data, and initial condition center-of-gravity (CG) data that is representative of at least an estimated initial position of the CG of the aircraft. The processing system is configured to process at least the speed data and the initial condition CG data to: (i) determine an expected elevator load on the elevator flight control surface, (ii) determine if the expected elevator load exceeds the sensed elevator load by a predetermined magnitude, and (iii) when the expected elevator load exceeds the sensed elevator load by a predetermined magnitude, generate a disconnect signal that will disable the auto pitch trim function.

In another embodiment, a method of detecting yoke interference in an aircraft having an auto pitch trim function includes supplying elevator load data from a source of elevator load data, where the elevator load data is representative of sensed load on an elevator flight control surface. Aircraft speed data is supplied from a source of aircraft speed data, where the aircraft speed data is representative of sensed aircraft speed. The elevator load data, the aircraft speed data, and initial condition center-of-gravity (CG) data that is representative of at least an estimated initial position of the CG of the aircraft is received in a processing system. The processing system processes at least the speed data and the initial condition CG data to: (i) determine an expected elevator load on the elevator flight control surface, and (ii) determine if the expected elevator load exceeds the sensed elevator load by a predetermined magnitude. When the expected elevator load exceeds the sensed elevator load by a predetermined magnitude the processing system generates a disconnect signal that will disable the auto pitch trim function.

In yet another embodiment, an aircraft includes at least one elevator, a yoke responsive to input to move the at least one elevator, an autopilot system operable to implement an auto pitch trim function, and a yoke interference detection system in operable communication with the yoke and the autopilot system. The yoke interference detection system a source of elevator load data, a source of aircraft speed data, and a processing system. The elevator load data is representative of sensed load on an elevator flight control surface, and the aircraft speed data is representative of sensed aircraft speed. The processing system is coupled to receive the elevator load data, the aircraft speed data, and initial condition center-of-gravity (CG) data that is representative of at least an estimated initial position of the CG of the aircraft. The processing system is configured to process at least the speed data and the initial condition CG data to: (i) determine an expected elevator load on the elevator flight control surface, (ii) determine if the expected elevator load exceeds the sensed elevator load by a predetermined magnitude, and (iii) when the expected elevator load exceeds the sensed elevator load by a predetermined magnitude, generate a disconnect signal that will disable the auto pitch trim function.

Furthermore, other desirable features and characteristics of the aircraft yoke interference detection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
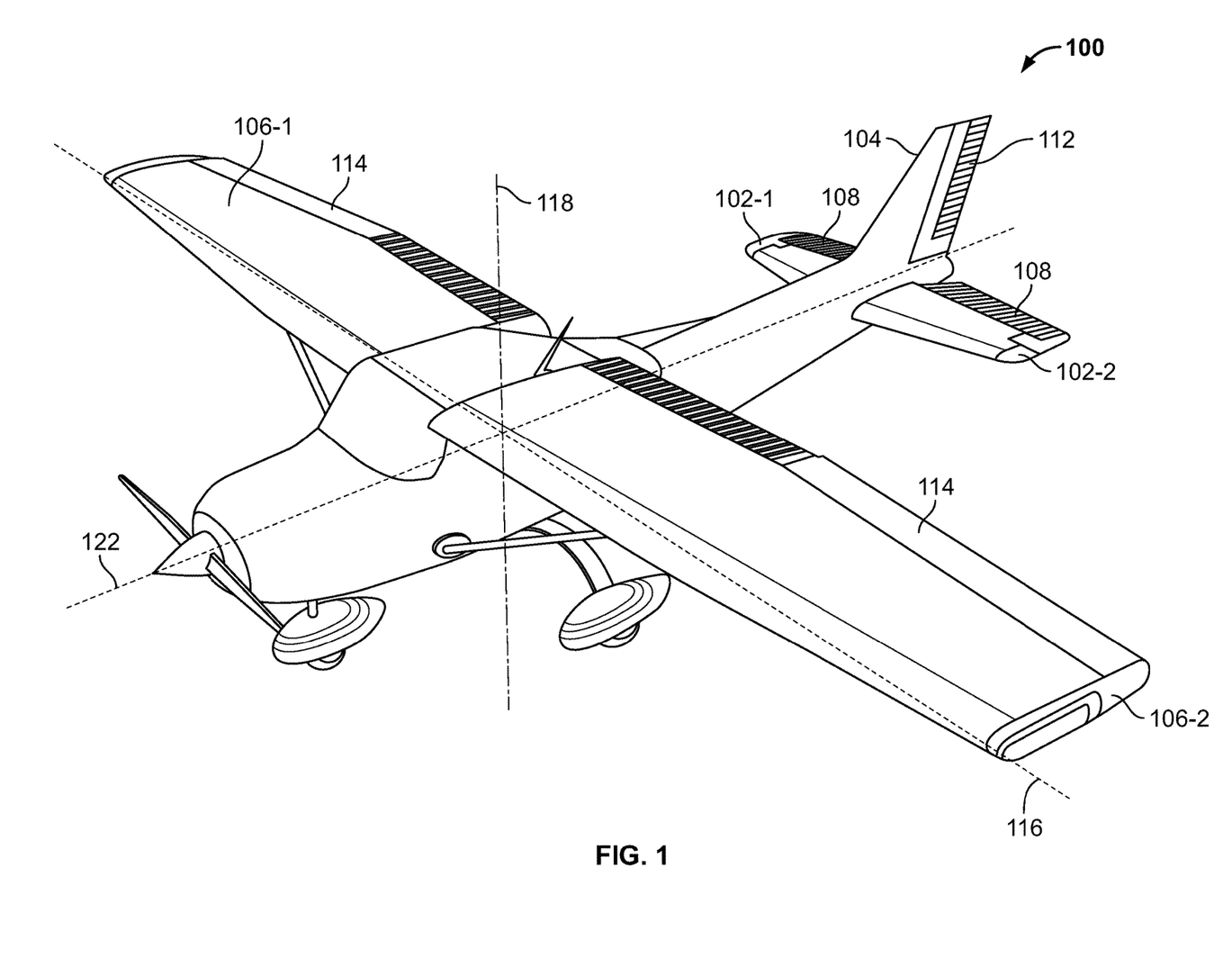
FIG. 1 depicts a plan view of one embodiment of an aircraft.

Referring first to FIG. 1, a plan view of one embodiment of an aircraft is depicted. Although the depicted aircraft 100 is a single engine, fixed-wing aircraft, it will be appreciated that embodiments of the aircraft yoke interference detection system and method described herein may be implemented in numerous other types of aircraft, including various types of multi-engine aircraft. In one particular preferred embodiment, it is implemented in an aircraft with a reversible elevator control system.

The depicted aircraft 100 includes first and second horizontal stabilizers 102-1 and 102-2, respectively, a vertical stabilizer 104, and first and second wings 106-1 and 106-2, respectively. An elevator 108 is disposed on each horizontal stabilizer 102-1, 102-2, a rudder 112 is disposed on the vertical stabilizer 104, and an aileron 114 is disposed on each wing 106-1, 106-2. The elevators 108, rudder 112, and ailerons 114 are typically referred to as the primary flight control surfaces. Although not depicted or further described herein, the aircraft 100 may additionally include various other flight control surfaces, such as flaps, slats, spoilers, and trim tabs, depending on the particular aircraft type. These additional flight control surfaces, which are not further described herein, are typically referred to as secondary flight control surfaces.

As is generally known, the primary flight control surfaces 108-114 control aircraft movements about three perpendicular axes—the pitch axis 116, the yaw axis 118, and the roll axis 122. Specifically, the elevators 108 are used to control aircraft movement about the pitch axis 116, the rudder 112 is used to control aircraft movement about the yaw axis 118, and the ailerons 114 are used to control aircraft movement about the roll axis 122.

Figure 2:
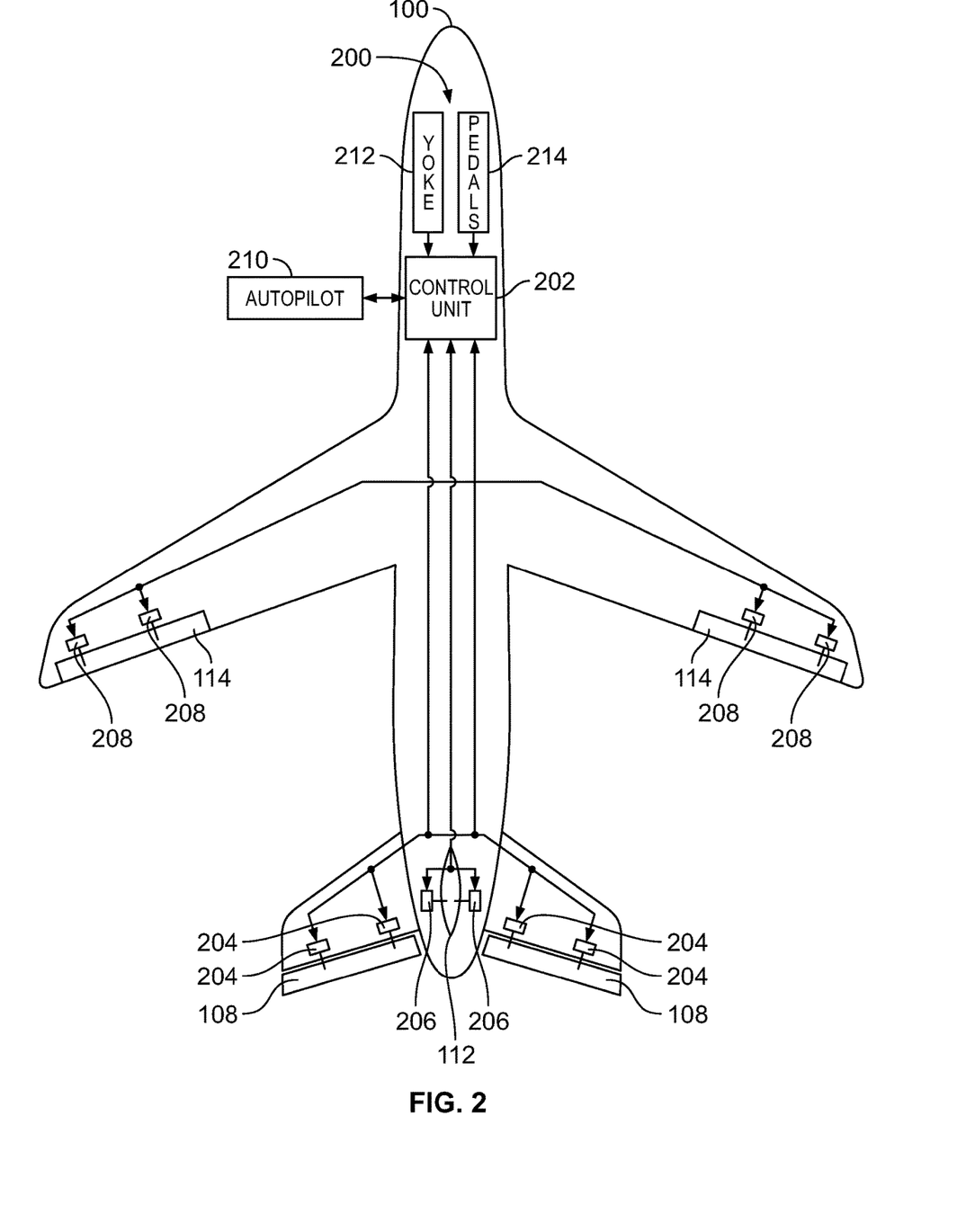
FIG. 2 depicts a functional schematic representation of one embodiment of a flight control surface actuation system that may be implemented in the aircraft of FIG. 1.

The flight control surfaces 108-114 are moved to commanded positions via a flight control surface actuation system 200, an exemplary embodiment of which is shown in FIG. 2. In the depicted embodiment, the flight control surface actuation system 200 includes one or more control units 202, a plurality of primary flight control surface actuators, which include elevator actuators 204, rudder actuators 206, and aileron actuators 208. It will be appreciated that the system 200 is preferably implemented with more than one control unit 202. However, for ease of description and illustration, only a single, multi-channel control unit 202 is depicted. It will additionally be appreciated that one or more functions of the control unit 202 could be implemented using a plurality of devices.

The primary flight control surface actuators 204-208 may be variously configured and implemented. For example, each actuator may be implemented using a servo motor that is configured to directly drive its associated flight control surface 108-114, or it may be configured using a servo motor that drives an actuation device (e.g., a linear or rotary actuation device) that is in turn coupled to its associated flight control surface 108-114. Regardless of the specific configuration and implementation, and as FIG. 2 additionally depicts, flight control surfaces 108-114 may be manually controlled from the flight deck or automatically controlled via an aircraft autopilot system 210.

When controlled manually, the elevators 108 and ailerons 114 are controlled via a yoke 212, and the rudder 112 is controlled via foot pedals 214. Before proceeding further, it is noted that although the term "yoke" is used herein to denote the pilot interface that is used for elevator and aileron control, it will be appreciated that this term, as used herein, encompasses not only conventional yoke configurations, but control stick, joystick, and wheel configurations, just to name a few.

When controlled automatically, the aircraft autopilot system 210 receives various inputs and supplies appropriate commands to the primary flight control surface actuators 204-208 to control aircraft movements about the pitch, yaw, and roll axes 116, 118, 122. In doing so, the aircraft autopilot system 210 implements various control functions. Included among these functions is the Automatic Pitch Trim (APT) function, which is configured to automatically control the position of the elevators 108, and thus the pitch of the aircraft 100. The various other functions of the autopilot system 210 are not needed to understand the claimed invention and will thus not be further mentioned or described herein.

Figure 3:
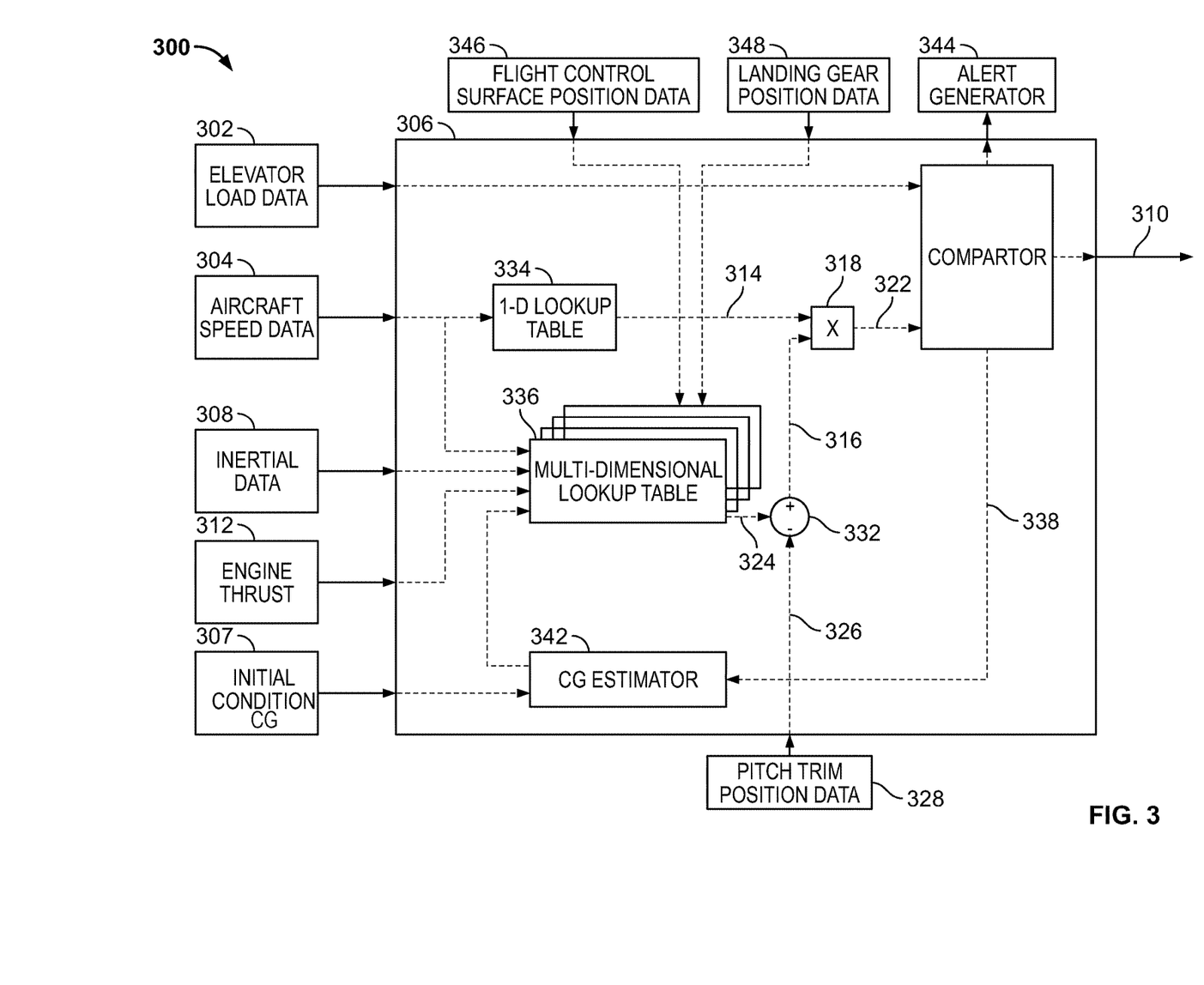
FIG. 3 depicts one embodiment of a yoke interference detection system that may be implemented in the aircraft of FIG. 1.

As previously mentioned, there have been instances in which a pilot has unintentionally interfered with the yoke 212, placing it into a non-commanded pitch position while the APT function is engaged. The response in current aircraft autopilot systems under such situations has been less than optimal. However, the aircraft 100 described herein includes a yoke interference detection system that overcomes the drawbacks of current systems. One embodiment of the yoke interference detection system is depicted in FIG. 3, and with reference thereto will now be described.

The depicted yoke interference detection system 300 includes a source of elevator load data 302, a source of aircraft speed data 304, and a processing system 306. The elevator load data is representative of the sensed load on an elevator flight control surface 108. As may be appreciated, the source of the elevator load data 302 may vary and may be any sensor suitable for use in sensing the load on the associated elevator actuator 204, and may vary depending on the type of elevator actuator 204 that is used. Some non-limiting examples include various types of current sensors, various types of torque sensors, and various types of tensiometers, just to name a few.

The aircraft speed data is representative of the sensed aircraft speed, which may be in units of calibrated airspeed (CAS) or Mach number. As may also be appreciated, the source of aircraft speed data 304 may vary and may be implemented using any one of numerous sources of aircraft speed. For example, the source of airspeed data 304 may be one or more fuselage mounted air data sensors, one or more wing mounted air data sensors, and the onboard aircraft avionics system, just to name a few.

No matter the specific sources of elevator load data 302 and aircraft speed data 304, the processing system 306 is coupled to receive the elevator load data and the aircraft speed data, and is also coupled to receive initial condition center-of-gravity (CG) data 307. The initial condition CG data 307 is representative of an estimate of the initial position of the CG of the aircraft 100. This initial condition CG data 307 may be a predetermined fault value, or it may be supplied from the aircraft flight management system (FMS), or it may be manually input to the system 300.

Before proceeding further, it is noted that the processing system 306 generally represents the hardware, circuitry, processing logic, and/or other components configured to facilitate communications and/or interaction between the elements of the yoke interference detection system 300 and perform additional processes, tasks and/or functions to support operation of the yoke interference detection system 300, as described in greater detail below. Depending on the embodiment, the processing system 306 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 306 includes processing logic that may be configured to carry out the functions, techniques, and processing tasks associated with the operation of the yoke interference detection system 300 described in greater detail below. Furthermore, the steps of a method or algorithm described in connection with the embodiments disclosed herein may be embodied directly in hardware, in firmware, in a software module executed by the processing system 306, or in any practical combination thereof. In accordance with one or more embodiments, the processing system 306 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 306 to execute and perform one or more of the processes, tasks, operations, and/or functions described herein.

Returning now to the description, the processing system 306 is configured to process at least the speed data and the initial condition CG data to determine an expected elevator load on the elevator flight control surface 108, and to determine if the expected elevator load exceeds the sensed elevator load by a predetermined magnitude. If the expected elevator load exceeds the sensed elevator load by the predetermined magnitude, this is indicative of yoke interference. Thus, the processing system 306 is also configured, upon determining that the expected elevator load exceeds the sensed elevator load by the predetermined magnitude, to generate and supply a disconnect signal 310 that will disable the APT function in the aircraft autopilot system 210.

The processing system 306 may also, in at least some embodiments, receive and process additional aircraft-related data to even more accurately detect yoke interference. For example, as FIG. 3 further depicts the system 300 may additionally include a source of inertial data 308. The inertial data may be supplied from, for example, aircraft installed inertial sensors, which sense aircraft bank angle. The inertial data is thus representative of the sensed aircraft bank angle. In such embodiments, the processing system 306 is additionally configured to receive and process the inertial data to determine if the expected elevator load exceeds the sensed elevator load by the predetermined magnitude. As FIG. 3 also depicts, the system 300 may, in some embodiments, additionally include a source of engine thrust data 312, as engine thrust may, for some aircraft, influence the elevator load. The source of engine thrust data 312 may be, for example, the aircraft avionics system.

The processing system 306, as illustrated in FIG. 3, is configured to determine the expected elevator load on the elevator flight control surface 108 by determining a load-trim ratio 314 and a pitch trim position error 316. As used herein, the load-trim ratio 314 is defined as (and is thus equal to) the elevator load per degree of mis-trim. Thus, the processing system 306, by multiplying these two values, via a multiplier function 318, derives the expected elevator load 322.

The load-trim ratio 314, as will be described more fully below, is derived by processing the aircraft speed data. The pitch trim position error 316 is derived by processing expected aircraft pitch trim position 324 and actual aircraft pitch trim position 326. As will also be described more fully below, the expected aircraft pitch trim position 324 is derived from the aircraft speed data, the inertial data, and at least the initial condition CG data. In those embodiments that include the source of engine thrust data 312, the expected aircraft pitch trim position 324 may also be derived using this data.

The actual aircraft pitch trim position 326 is derived by processing pitch trim position data. The pitch trim position data, which is supplied from a source of pitch trim position data 328, is representative of that actual aircraft pitch trim position. The source of pitch trim position data 328 may vary and may be implemented using any one of numerous sources of pitch trim position. For example, the source of pitch trim position data 328 may be, for example, a potentiometer.

Regardless of the specific source of the pitch trim position data 328, it is seen that the processing system 306 determines the pitch trim position error 316 by comparing the expected aircraft pitch trim position 324 and the actual aircraft pitch trim position 326. More specifically, at least in the depicted embodiment, the processing system 306 determines the pitch trim position error 316 by subtracting, via a subtraction function 332, the actual aircraft pitch trim position 326 from the expected aircraft pitch trim position 324.

The processing system 306 may be variously configured to implement the above-described functionality. For example, the processing system 306 may be configured to implement a plurality of relatively simple software models, a plurality of high-fidelity, physics-based software models, or a plurality of look-up tables. In the depicted embodiment, the processing system 306 is configured to implement a plurality of look-up tables. In particular, the depicted processing system 306 determines the load-trim ratio from the aircraft speed data by implementing a one-dimensional look-up table 334 that relates aircraft speed to load-trim ratio. The processing system 306 determines the expected aircraft pitch trim position by implementing a multi-dimensional look-up table 336 (e.g., 3-dimensional) that relates aircraft speed, the bank angle, and at least the initial condition CG data to expected aircraft pitch trim position. As may be appreciated, if engine thrust is also included, the multi-dimensional look-up table 336 may be a 4-dimensional look-up table.

As is generally known, the actual CG position of the aircraft 100 may change during the course of the flight. This may result from various factors, such as fuel burn, passenger movement, etc. Thus, the processing system 306 may also be configured, at least in some embodiments, to continuously update the initial condition CG data to thereby determine and supply real-time estimated CG data that is representative of the current CG position of the aircraft. In such embodiments, and as FIG. 3 depicts, the processing system is configured to determine an elevator load error 338, which is the difference between the expected elevator load and the sensed elevator load. It should be noted that it is the elevator load error 338 that is compared to the predetermined magnitude to determine if the expected elevator load exceeds the sensed elevator load by the predetermined magnitude. In any case, and as FIG. 3 further depicts, the processing system 306 determines and supplies the real-time estimated CG data based on the elevator load error 338. In the depicted embodiment, the processing system 306 uses a first-order filter 342 to implement a CG estimator, which determines and supplies the real-time estimated CG data.

In addition to generating and supplying the disconnect signal to disable the APT function in the aircraft autopilot system 212, the processing system 306 may also generate and supply an alert signal when the expected servo load exceeds the sensed servo load by the predetermined magnitude. In such embodiments, the alert signal is preferably supplied to an alert generator 344, which is responsive to the alert signal to generate an alert to the pilot that the APT function has been disabled. The alert generator may be an audible alert generator, a visual alert generator, or a combination of both.

The positions and configurations of various secondary flight control surfaces, such as the flaps (not previously described), and the position of the aircraft landing gear, may also impact the expected elevator load. Thus, in some embodiments, the processing system 306 may be configured to implement a plurality of multi-dimensional tables, one associated with various positions of the flight control surfaces and landing gear, to determine the expected servo load on the elevator flight control surface 108. In such embodiments, the system 300 may also include a source of flight control surface position data 346, where the flight control surface position data is representative of the positions of one or more of the aircraft flight control surfaces. The system 300 may also include a source of landing gear position data 348, where the landing gear position data is representative of the aircraft landing gear position. Although the aircraft 100 depicted in FIG. 1 and described above has non-retractable landing gear, it will be appreciated that the system 300 may be implemented in aircraft that do include retractable landing gear. In such embodiments, the processing system 306 is further coupled to receive the flight control surface position data and the landing gear position data, and is further configured to determine the expected servo load on the elevator flight control surface based additionally on the flight control surface position data and the landing gear position data.

Figure 4:
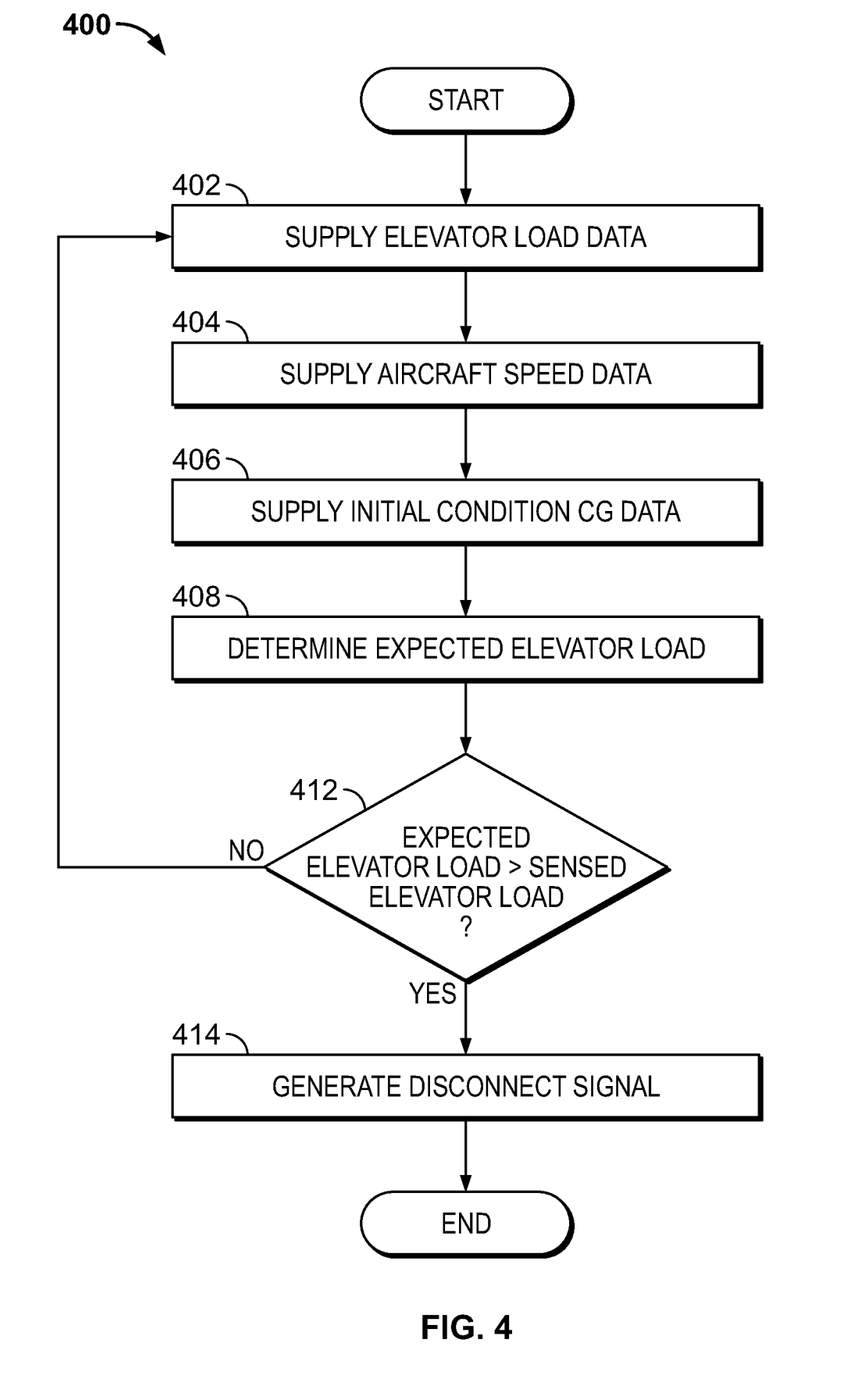
FIG. 4 depicts a process, in flowchart form, that may be implemented in the yoke interference detection system of FIG. 3.

Referring now to FIG. 4, the general process 400 implemented in the yoke interference detection system 300 is depicted in flowchart form and includes supplying elevator load data from the source of elevator load data (402), supplying aircraft speed data from the source of aircraft speed data (404), and supplying the initial condition CG data (406) to the processing system. At least the speed data and the initial condition CG data are processed in the processing system 306 to determine an expected elevator load on the elevator flight control surface (408) and determine if the expected elevator load exceeds the sensed elevator load by a predetermined magnitude (412). If the expected elevator load does not exceed the sensed elevator load by the predetermined magnitude, the process repeats. If, however, the expected elevator load does exceed the sensed elevator load by the predetermined magnitude, a disconnect signal that will disable the auto pitch trim function is generated (414).

The system and method described herein provides relatively early detection of undesired yoke interference, to thereby allow the APT function to be automatically disengaged before the aircraft attains an undesired out-of-trim condition.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft yoke interference detection system for an aircraft having an auto pitch trim function, comprising:
   a source of elevator load data, the elevator load data representative of sensed load on an elevator flight control surface;
   a source of aircraft speed data, the aircraft speed data representative of sensed aircraft speed; and
   a processing system coupled to receive the elevator load data, the aircraft speed data, and initial condition center-of-gravity (CG) data, the initial condition CG data representative of at least an estimated initial position of the CG of the aircraft, the processing system configured to process at least the speed data and the initial condition CG data to:
   (i) determine an expected elevator load on the elevator flight control surface,
   (ii) determine if the expected elevator load exceeds the sensed elevator load by a predetermined magnitude, and (iii) when the expected elevator load exceeds the sensed elevator load by a predetermined magnitude, generate a disconnect signal that will disable the auto pitch trim function.

2. The system of claim 1, wherein the processing system is further configured to continuously update the initial condition CG data to thereby determine and supply real-time estimated CG data that is representative of a current CG position of the aircraft.

3. The system of claim 2, wherein the processing system is configured to:
determine if the expected elevator load exceeds the sensed elevator load by the predetermined magnitude by determining an elevator load error, the elevator load error being a difference between the expected elevator load and the sensed elevator load; and
determine and supply the real-time estimated CG data based on the elevator load error.

4. The system of claim 3, wherein the processing system implements a first-order filter to determine and supply the real-time estimated CG data.

5. The system of claim 1, wherein:
the system further comprises a source of inertial data, the inertial data representative of sensed aircraft bank angle;
the processing system is further coupled to receive the inertial data; and
the processing system is further configured to process the inertial data to determine if the expected elevator load exceeds the sensed elevator load by the predetermined magnitude.

6. The system of claim 5, wherein:
the system further comprises a source of pitch trim position data, the pitch trim position data representative of actual aircraft pitch trim position;
the processing system is further configured to:
(i) process the aircraft speed data, the inertial data, and at least the initial condition CG data to determine an expected aircraft pitch trim position, and
(ii) determine a pitch trim position error by comparing the expected aircraft pitch trim position and the actual aircraft pitch trim position.

7. The system of claim 6, wherein the processing system implements a multi-dimensional look-up table to determine the expected aircraft pitch trim position from the aircraft speed data, the inertial data, and at least the initial condition CG data.

8. The system of claim 7, wherein the processing system implements a one-dimensional look-up table to determine the load-trim ratio from the aircraft speed data.

9. The system of claim 6, wherein the processing system is further configured to:
process the aircraft speed data to determine a load-trim ratio, the load-trim ratio equal to elevator load per degree of mis-trim; and
determine the expected load on the elevator flight control surface from the pitch trim position error and the load-trim ratio.

10. The system of claim 1, further comprising:
an alert generator responsive to an alert signal to generate an alert,
wherein:
the processing system is in operable communication with the alert generator, and
the processing system is further configured, when the expected servo load exceeds the sensed servo load by the predetermined magnitude, to generate and supply the alert signal.

11. The system of claim 1, further comprising:
a source of flight control surface position data, the flight control surface position data representative of positions of one or more aircraft flight control surfaces; and
a source of landing gear position data, the landing gear position data representative of aircraft landing gear position,
wherein the processing system is further coupled to receive the flight control surface position data and the landing gear position data, and is further configured to determine the expected servo load on the elevator flight control surface based additionally on the flight control surface position data and the landing gear position data.

12. A method of detecting yoke interference in an aircraft having an auto pitch trim function, the method comprising the steps of:
supplying elevator load data from a source of elevator load data, the elevator load data representative of sensed load on an elevator flight control surface;
supplying aircraft speed data from a source of aircraft speed data, the aircraft speed data representative of sensed aircraft speed; and
receiving, in a processing system, the elevator load data, the aircraft speed data, and initial condition center-of-gravity (CG) data, the initial condition CG data representative of at least an estimated initial position of the CG of the aircraft;
processing, in the processing system, at least the speed data and the initial condition CG data to: (i) determine an expected elevator load on the elevator flight control surface, and (ii) determine if the expected elevator load exceeds the sensed elevator load by a predetermined magnitude; and
when the expected elevator load exceeds the sensed elevator load by a predetermined magnitude, generating, with the processing system, a disconnect signal that will disable the auto pitch trim function.

13. The method of claim 12, further comprising continuously updating the initial condition CG data in the processing system to thereby determine and supply real-time estimated CG data that is representative of a current CG position of the aircraft.

14. The method of claim 13, wherein the step of continuously updating the initial condition CG data includes:
determining if the expected elevator load exceeds the sensed elevator load by the predetermined magnitude by determining an elevator load error, the elevator load error being a difference between the expected elevator load and the sensed elevator load; and
determining and supply the real-time estimated CG data based on the elevator load error.

15. The method of claim 12, further comprising:
supplying inertial data from a source of inertial data, the inertial data representative of sensed aircraft bank angle;
receiving and processing the inertial data, in the processing system, to determine if the expected elevator load exceeds the sensed elevator load by the predetermined magnitude.

16. The method of claim 15, further comprising:
supplying pitch trim position data from a source of pitch trim position data, the pitch trim position data representative of actual aircraft pitch trim position;

processing the aircraft speed data, the inertial data, and at least the initial condition CG data to determine an expected aircraft pitch trim position, and determining, in the processing system, a pitch trim position error by comparing, in the processing system, the expected aircraft pitch trim position and the actual aircraft pitch trim position.

17. The method of claim 16, further comprising:

processing, in the processing system, the aircraft speed data to determine a load-trim ratio, the load-trim ratio equal to elevator load per degree of mis-trim; and determining, in the processing system, the expected load on the elevator flight control surface from the pitch trim position error and the load-trim ratio.

18. The method of claim 12, further comprising:

generating and supplying an alert signal to an alert generator when the expected servo load exceeds the sensed servo load by the predetermined magnitude.

19. The method of claim 12, further comprising:

supplying flight control surface position data from a source of flight control surface position data, the flight control surface position data representative of positions of one or more aircraft flight control surfaces;

supplying landing gear position data from a source of landing gear position data, the landing gear position data representative of aircraft landing gear position; and receiving and processing, in the processing system, the flight control surface position data and the landing gear position data to determine the expected servo load on the elevator flight control surface based additionally on the flight control surface position data and the landing gear position data.

20. An aircraft, comprising:

at least one elevator;

a yoke responsive to input to move the at least one elevator;

an autopilot system operable to implement an auto pitch trim function; and a yoke interference detection system in operable communication with the yoke and the autopilot system, the yoke interference detection system including:

a source of elevator load data, the elevator load data representative of sensed load on an elevator flight control surface;

a source of aircraft speed data, the aircraft speed data representative of sensed aircraft speed; and a processing system coupled to receive the elevator load data, the aircraft speed data, and initial condition center-of-gravity (CG) data, the initial condition CG data representative of at least an estimated initial position of the CG of the aircraft, the processing system configured to process at least the speed data and the initial condition CG data to:

(i) determine an expected elevator load on the elevator flight control surface, (ii) determine if the expected elevator load exceeds the sensed elevator load by a predetermined magnitude, and (iii) when the expected elevator load exceeds the sensed elevator load by a predetermined magnitude, generate a disconnect signal that will disable the auto pitch trim function.

* * * * *